US010489503B2

(12) United States Patent
Padgett et al.

(10) Patent No.: US 10,489,503 B2
(45) Date of Patent: *Nov. 26, 2019

(54) AUTOMATED FORM LAYOUT BASED UPON USAGE PATTERNS

(71) Applicant: International Business Machines Corporation, Armonk, NY (US)

(72) Inventors: Samuel G. Padgett, Raleigh, NC (US); Sreedhar Rella, Westford, MA (US); Steven K. Speicher, Holly Springs, NC (US); Michael J. Tabb, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/992,893

(22) Filed: May 30, 2018

(65) Prior Publication Data

US 2018/0276194 A1    Sep. 27, 2018

Related U.S. Application Data

(63) Continuation of application No. 14/950,810, filed on Nov. 24, 2015, now Pat. No. 10,002,118, which is a
(Continued)

(51) Int. Cl.
*G06F 17/00* (2019.01)
*G06F 17/24* (2006.01)
(Continued)

(52) U.S. Cl.
CPC .......... *G06F 17/243* (2013.01); *G06F 3/0481* (2013.01); *G06F 3/04895* (2013.01); *G06F 17/211* (2013.01)

(58) Field of Classification Search
CPC .... G06F 17/211; G06F 17/243; G06F 3/0481; G06F 3/04895
See application file for complete search history.

(56) References Cited

U.S. PATENT DOCUMENTS 5,704,029 A * 12/1997 Wright, Jr. ............ G06F 17/243
                                                              345/173
7,216,292 B1 * 5/2007 Snapper ................ G06F 17/243
                                                              715/234
(Continued)

FOREIGN PATENT DOCUMENTS

JP      18-298838 A      5/2008
JP      19-260317 A      4/2009

OTHER PUBLICATIONS

Vera Hollink, et al., A Semi-Automatic Usage-Based Method for Improving Hyperlink Descriptions in Menus, International Journal of Human-Computer Studies, Nov. 2008, pp. 366-381, vol. 67, Issue 4, Elsevier Ltd., The Netherlands.
(Continued)

*Primary Examiner* — Cesar B Paula
*Assistant Examiner* — David Faber
(74) *Attorney, Agent, or Firm* — Lee Law, PLLC; Christopher B. Lee

(57) ABSTRACT

Historical form input field usage information of a group of input fields associated with a graphical user interface (GUI) form is used to automatically partition a subset of the group of input fields into a new form within a new tabbed portion of the displayed GUI form. The new form includes a set of selectable options that allow a user to select between reorganizing the subset of the input fields according to historical input field usage analysis of the user and reorganizing the subset of the plurality of input fields according to historical input field usage analysis of a group of form users within which the user is a member. The subset of the input fields
(Continued)

within the new form is reorganized responsive to different user selections among the set of selectable options.

20 Claims, 6 Drawing Sheets

Related U.S. Application Data continuation of application No. 12/629,262, filed on Dec. 2, 2009, now Pat. No. 9,275,029.

(51) Int. Cl.
  *G06F 3/0481* (2013.01)
  *G06F 3/0489* (2013.01)
  *G06F 17/21* (2006.01)

(56) References Cited

U.S. PATENT DOCUMENTS

| | | | |
|---|---|---|---|
| 7,313,757 B2 | 12/2007 | Bradley et al. | |
| 7,512,655 B2* | 3/2009 | Armstrong | G06Q 10/10 709/205 |
| 8,352,861 B2* | 1/2013 | Kitayama | G06Q 10/10 715/221 |
| 8,375,295 B2 | 2/2013 | Zalewski et al. | |
| 8,490,010 B2* | 7/2013 | Stienhans | G06F 9/451 715/789 |
| 9,009,585 B1* | 4/2015 | Chetrit | G06F 9/453 715/221 |
| 9,275,029 B2 | 3/2016 | Padgett et al. | |
| 2002/0077921 A1* | 6/2002 | Morrison | G06Q 30/02 705/26.1 |
| 2002/0099739 A1* | 7/2002 | Fischer | G06F 16/9577 715/239 |
| 2004/0085362 A1 | 5/2004 | Sauermann et al. | |
| 2005/0065933 A1 | 3/2005 | Goering | |
| 2006/0075392 A1 | 4/2006 | Carrier et al. | |
| 2006/0161837 A1 | 7/2006 | Kelkar et al. | |
| 2007/0136682 A1* | 6/2007 | Stienhans | G06F 9/451 715/789 |
| 2007/0150836 A1* | 6/2007 | Deggelmann | G06F 3/0483 715/810 |
| 2007/0168849 A1 | 7/2007 | Bell et al. | |
| 2007/0234209 A1* | 10/2007 | Williams | G06F 3/04842 715/700 |
| 2007/0256005 A1* | 11/2007 | Schneider | G06F 17/2235 |
| 2009/0204584 A1* | 8/2009 | Harada | G06F 16/951 |
| 2011/0214067 A1* | 9/2011 | Tanaka | G06F 3/0481 715/745 |
| 2016/0077728 A1 | 3/2016 | Padgett et al. | |

OTHER PUBLICATIONS

Sean Thompson, et al., A Process Improvement Approach to Improve Web Form Design and Usability, In Proceedings of the 18th International Workshop on Database and Expert Systems Applications, Sep. 2007, pp. 570-574 (citation attached as first page), IEEE Computer Society, U.S.A.
United States Patent and Trademark Office, Office Action for U.S. Appl. No. 12/629,262, dated Jan. 18, 2011, pp. 1-16.
United States Patent and Trademark Office, Office Action for U.S. Appl. No. 12/629,262, dated Apr. 27, 2011. pp. 1-15.
United States Patent and Trademark Office, Office Action for U.S. Appl. No. 12/629,262, dated Feb. 14, 2014, pp. 1-17.
United States Patent and Trademark Office, Office Action for U.S. Appl. No. 12/629,262, dated Jul. 1, 2014, pp. 1-25.
United States Patent and Trademark Office, Decision on Pre-Appeal for U.S. Appl. No. 12/629,262, dated Nov. 20, 2014, pp. 1-2.
United States Patent and Trademark Office, Office Action for U.S. Appl. No. 12/629,262, dated Jun. 5, 2015, pp. 1-19.
United States Patent and Trademark Office, Notice of Allowance for U.S. Appl. No. 12/629,262, dated Nov. 6, 2015, pp. 1-16.
United States Patent and Trademark Office, Office Action for U.S. Appl. No. 14/950,810, dated Sep. 19, 2017, pp. 1-22.
United States Patent and Trademark Office, Notice of Allowance for U.S. Appl. No. 14/950,810, dated Feb. 12, 2018, pp. 1-13.

* cited by examiner

AUTOMATED FORM LAYOUT BASED UPON USAGE PATTERNS

BACKGROUND

The present invention relates to development of graphical user interface forms. More particularly, the present invention relates to automated form layout based upon usage patterns.

Graphical user interface (GUI) forms provide input and output capabilities for computing applications. Input capabilities include form fields, such as text entry fields, drop-down lists, radio buttons, check boxes, and other input fields. Users interact with a GUI form and selections or input associated with the various input fields is detected. Output is generated by a computing device. The output may be displayed via the same GUI form or via another GUI form.

SUMMARY

A method includes: analyzing, at a computing device, historical form input field usage information of a plurality of input fields associated with a graphical user interface (GUI) form displayed on a display of the computing device; automatically partitioning, based upon the historical usage characteristics for each of the plurality of input fields, a subset of the plurality of input fields with higher usage characteristics relative to another subset of the plurality of input fields into a new form within a new tabbed portion of the displayed GUI form, where the new form within the new tabbed portion of the displayed GUI form further comprises a set of selectable options that allow a user to select between reorganizing the subset of the plurality of input fields within the new form according to historical input field usage analysis of the user and reorganizing the subset of the plurality of input fields within the new form according to historical input field usage analysis of a group of form users within which the user is a member; and reorganizing the subset of the plurality of input fields within the new form responsive to different user selections among the set of selectable options within the new form within the new tabbed portion of the displayed GUI form.

A system includes a display, and a processor programmed to: analyze, via the processor, historical form input field usage information of a plurality of input fields associated with a graphical user interface (GUI) form displayed on the display; automatically partition, based upon the identified historical usage characteristics for each of the plurality of input fields, a subset of the plurality of input fields with higher usage characteristics relative to another subset of the plurality of input fields into a new form within a new tabbed portion of the displayed GUI form, where the new form within the new tabbed portion of the displayed GUI form further comprises a set of selectable options that allow a user to select between reorganizing the subset of the plurality of input fields within the new form according to historical input field usage analysis of the user and reorganizing the subset of the plurality of input fields within the new form according to historical input field usage analysis of a group of form users within which the user is a member; and reorganize the subset of the plurality of input fields within the new form responsive to different user selections among the set of selectable options within the new form within the new tabbed portion of the displayed GUI form.

A computer program product includes a non-transitory computer readable storage medium having computer readable program code stored therewith, where the computer readable program code when executed on a computer causes the computer to: analyze historical form input field usage information of a plurality of input fields associated with a graphical user interface (GUI) form displayed on a display of the computer; automatically partition, based upon the identified historical usage characteristics for each of the plurality of input fields, a subset of the plurality of input fields with higher usage characteristics relative to another subset of the plurality of input fields into a new form within a new tabbed portion of the displayed GUI form, where the new form within the new tabbed portion of the displayed GUI form further comprises a set of selectable options that allow a user to select between reorganizing the subset of the plurality of input fields within the new form according to historical input field usage analysis of the user and reorganizing the subset of the plurality of input fields within the new form according to historical input field usage analysis of a group of form users within which the user is a member; and reorganize the subset of the plurality of input fields within the new form responsive to different user selections among the set of selectable options within the new form within the new tabbed portion of the displayed GUI form.

DETAILED DESCRIPTION

Figure 1:
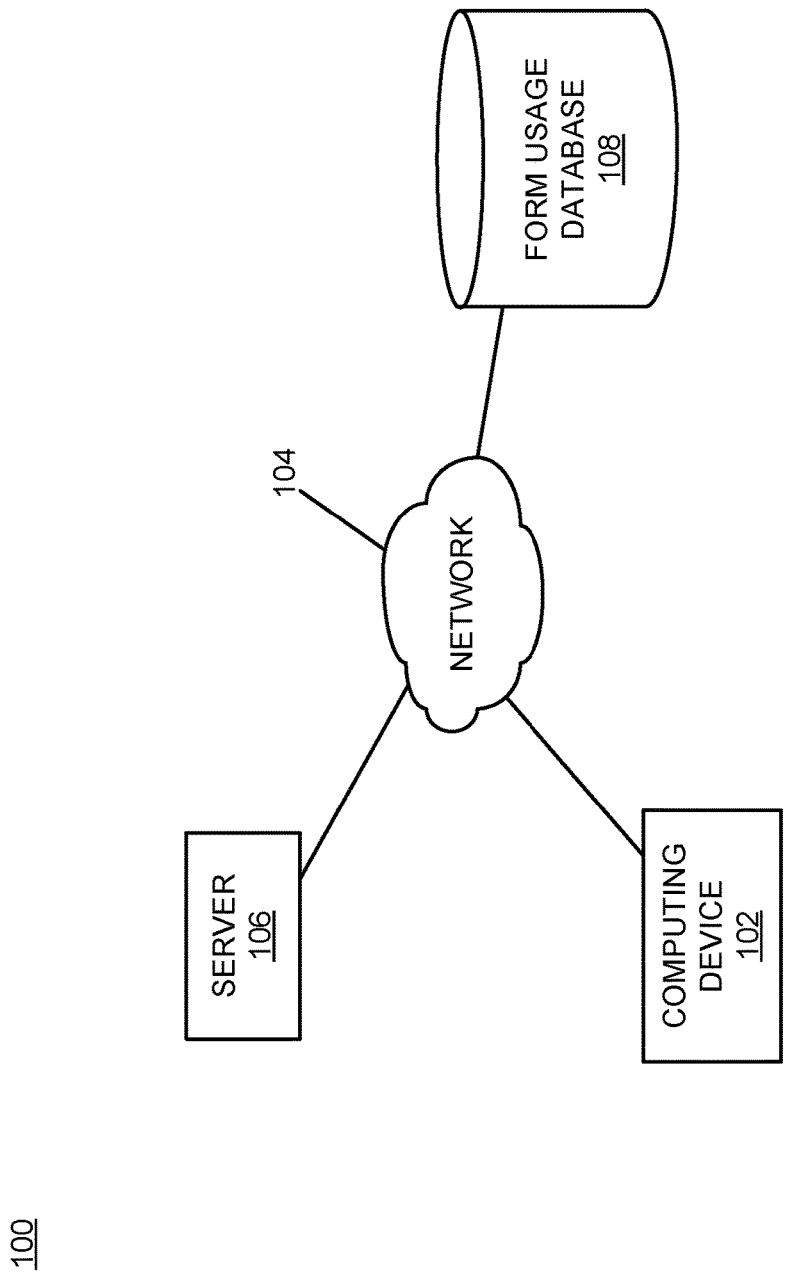
FIG. 1 is a block diagram of an example of an implementation of a system for automated form layout based upon usage patterns according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides automated form layout based upon usage patterns. A computing device analyzes historical form usage information for a plurality of fields, such as text entry fields, associated with a graphical user interface (GUI) form. Usage characteristics and/or trends are identified for each of the plurality of fields associated with the GUI form within the historical form usage information. A displayed version of the GUI form is automatically changed based upon the identified usage characteristics and/or trends for each of the plurality of fields. The changed GUI form is displayed on a display of the computing device.

The present subject matter may be used by form developers to improve form layout with developer interactions detected by the computing device, for example, for confirmation of automated changes prior to automated code generation or other changes that make the automated changes more permanent in nature. Additionally, the present subject matter may be used during run-time for an application to automatically change form layouts during interactive sessions of use for a form or set of forms, including supporting code changes and either compilation or interpretation of code changes for field position changes within forms.

Regarding analyzes of the historical form usage information and identification of the usage characteristics and/or trends for each of the plurality of fields associated with the GUI form, usage patterns may be extracted from historical form usage information. The extraction of the historical form usage information may include extraction of statistics about form usage, leveraging information from a current data model and form layout to produce recommendations for improved form design and layout for developers. Additionally, as described above, the changes may be fully automated to change forms for a given user or a given group of users.

Form design feedback may be provided to developers using real world usage data and form metadata. Fields that were used (e.g., had text entered by a user) may be identified and that usage information captured to identify more frequently-used form fields. Additionally, fields that were not used or seldom used may be identified and that usage information captured to identify lesser-used form fields. The capture of usage information may be based on a date and/or time stamp, and may be based on the state of the associated form entry record at the time of usage information capture. The usage information may be stored in a memory or database and compiled for use for the automated form layout based upon usage patterns described herein.

Form usage records may be stored and processed as either single records for each form, or multiple forms may be associated with a single usage record. The records may be stateful and the processing described herein may be implemented via a state machine without departure from the scope of the present subject matter.

As an additional example of use of the present subject matter, form developers may improve form layout via developer interactions which are detected by the computing device, including visual cues that may be associated with certain fields, as described in more detail below, to show a visual representation of the indentified usage characteristics and/or trends. Further developer interaction may be detected to identify form fields to be moved, reorganized, or otherwise changed within a visual form development environment.

Whether during development interaction within a visual form development environment or during run-time automated processing, visualization of the characteristic and/or trend data may be performed in a variety of ways. For example, gradual de-emphasis of form fields on existing forms may be utilized by adding graying effects to field labels, then allowing the user to reorganize form fields or automatically reorganizing form fields after a certain period of time of de-emphasis. Additionally, highlighting high-usage fields may be utilized by automatically drawing a surrounding box or colored box around those fields, then allowing the user to reorganize form fields or automatically reorganizing form fields after a certain period of time of highlighting. Many other examples of highlighting form usage characteristics and/or trends are possible and all are considered within the scope of the present subject matter. New form layouts may be proposed and user inputs to either accept or reject the proposed layouts may be detected and processed to perform the automated form layout based upon usage patterns described herein.

Further, groupings of form fields may be maintained while changing ordering of fields within a group. Certain fields or groups of fields may be designated as static (e.g., unchanging or locked), while other fields or groups of fields may be dynamic and changeable. Groups of fields may be separated into tabs, such as for either higher-usage or lower-usage fields. Additionally, higher-usage fields may be promoted over time and moved further toward either a top or center of a form to improve access to the respective fields, while lesser-used form fields may be migrated to either lower or more peripheral locations on a form.

Form users may also be allowed to specify certain criteria for the automated form layout based upon usage patterns described herein. The criteria may be incorporated into form change rules to be applied automatically for form changes. Example criteria may include, for example, fields entered for a given state, or state-transition (e.g., from a given state to another state for a form entry process). Additional criteria may include fields entered during a given timeframe (e.g., fields entered in a last 6 months), fields entered for records with specific field values (e.g., when a record's "product" field is a certain value), and fields frequently entered by a scoping or grouping of users (e.g., by individual, by team, by organization, etc.). Many other examples of criteria are possible and all are considered within the scope of the present subject matter.

While the description above relates to usage of the present subject matter generally based upon analysis of historical form usage information, the present subject matter may also be used without such historical form usage information. In such an implementation, a form user (e.g., developer or general user) may supply the computing device with default values as to which fields they forecast will be used when and in what states. These forecasts may be refined over time based upon actual form usage and historical information may be assembled over time to improve processing. As such, the present subject matter may be used to create the historical form usage information.

Additionally, users and developers may provide input for dynamic adjustment of forms in real time. As such, forms may be modified based upon user-supplied values. For example, where a form is used within a corporate information technology department and a trouble ticket is received with a high severity is received, form fields associated with the given severity may be automatically ranked higher and form layout may be automatically changed to highlight or otherwise enhance visibility of the associated form fields. In such an implementation, form fields, such as problem identifier, responsible professional, problem report information, and other associated fields may be prioritized and the form layout of associated fields or forms may be automatically modified to expedite form handling by the responsible professional assigned to handle the reported problem. Many other variations on dynamic form layout are possible and all are considered within the scope of the present subject matter.

The automated form layout based upon usage patterns described herein may be performed in real time to allow prompt changes to form layout based upon usage patterns. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for automated form layout based upon usage patterns. A computing device 102 communicates via a network 104 with a server 106. The communication with the server 106 may include, for example, retrieval of application forms for user interaction with an application stored on the server. Additionally, the communication with the server 106 may also include creation, access, and retrieval activities associated with historical form usage information stored within a form usage database 108, as appropriate for a given implementation.

As will be described in more detail below in association with FIG. 2 through FIG. 6, the computing device 102 provides automated form layout based upon usage patterns during either development or run-time for processed forms. The automated form layout based upon usage patterns is based upon historical form usage information and provides improved form layouts over time in response to the automated processing describe herein. The automated form layout based upon usage patterns may also include processing for creation and archival of historical form usage information.

It should be noted that the computing device 102 may be a portable computing device, either by a user's ability to move the computing device 102 to different locations, or by the computing device 102's association with a portable platform, such as a plane, train, automobile, or other moving vehicle. It should also be noted that the computing device 102 may be any computing device capable of processing information as described above and in more detail below. For example, the computing device 102 may include devices such as a personal computer (e.g., desktop, laptop, palm, etc.) or a handheld device (e.g., cellular telephone, personal digital assistant (PDA), email device, music recording or playback device, etc.), or any other device capable of processing information as described in more detail below.

The network 104 may include any form of interconnection suitable for the intended purpose, including a private or public network such as an intranet or the Internet, respectively, direct inter-module interconnection, dial-up, wireless, or any other interconnection mechanism capable of interconnecting the respective devices.

Figure 2:
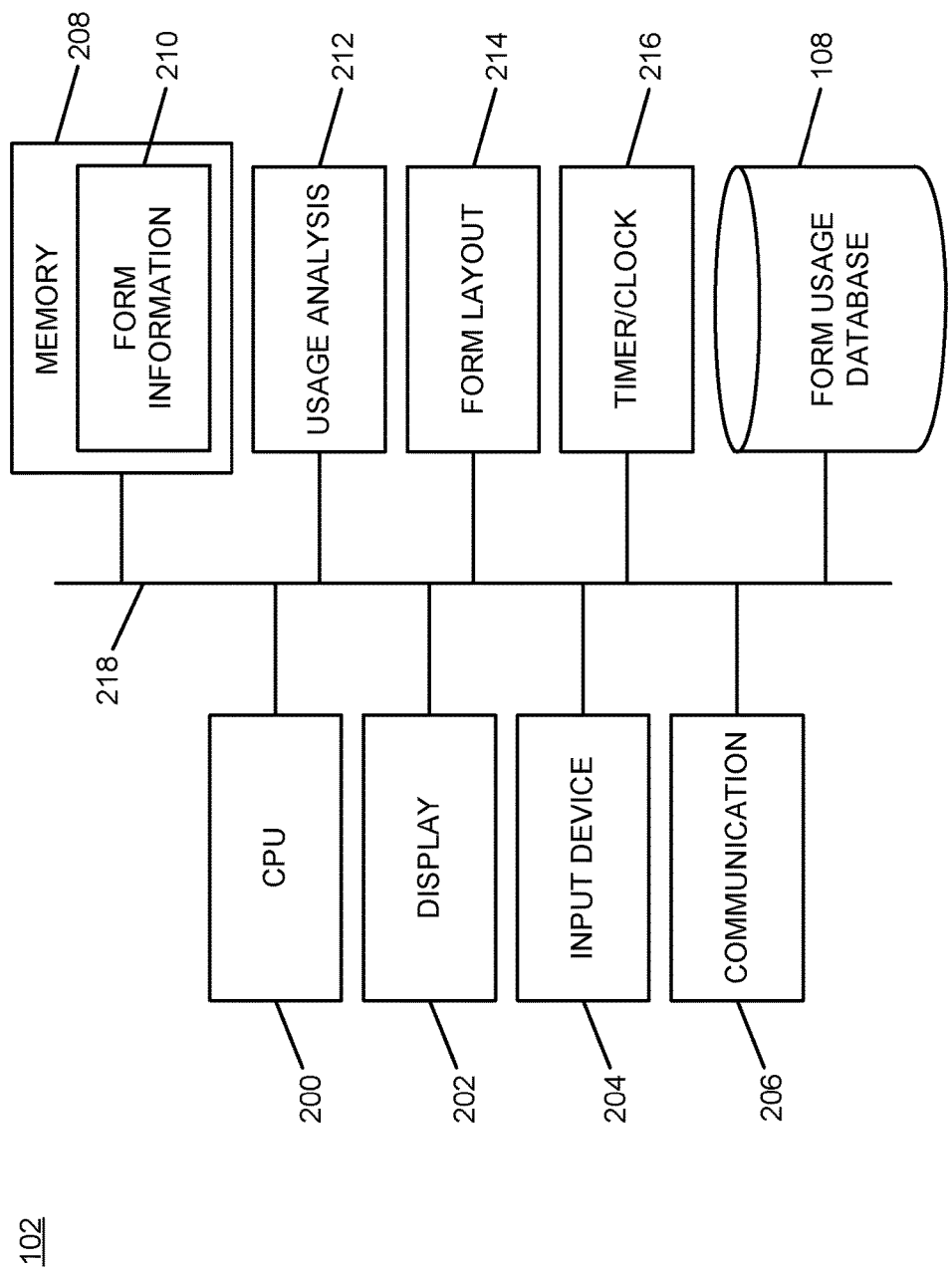
FIG. 2 is a block diagram of an example of an implementation of a computing device that is capable of performing automated form layout based upon usage patterns according to an embodiment of the present subject matter.

FIG. 2 is a block diagram of an example of an implementation of the computing device 102 that is capable of performing automated form layout based upon usage patterns. A central processing unit (CPU) 200 provides computer instruction execution, computation, and other capabilities within the computing device 102. A display 202 provides visual information to a user of the computing device 102 and an input device 204 provides input capabilities for the user.

The display 202 may include any display device, such as a cathode ray tube (CRT), liquid crystal display (LCD), light emitting diode (LED), projection, touchscreen, or other display element or panel. The input device 204 may include a computer keyboard, a keypad, a mouse, a pen, a joystick, or any other type of input device by which the user may interact with and respond to information on the display 202.

A communication module 206 provides interconnection capabilities that allow the computing device 102 to communicate with other modules within the system 100, such as the server 106, to perform the automated form layout based upon usage patterns. The communication module 206 may include any electrical, protocol, and protocol conversion capabilities useable to provide the interconnection capabilities. Though the communication module 206 is illustrated as a component-level module for ease of illustration and description purposes, it should be noted that the communication module 206 may include any hardware, programmed processor(s), and memory used to carry out the functions of the communication module 206 as described above and in more detail below. For example, the communication module 206 may include additional controller circuitry in the form of application specific integrated circuits (ASICs), processors, antennas, and/or discrete integrated circuits and components for performing communication and electrical control activities associated with the communication module 206. Additionally, the communication module 206 may include interrupt-level, stack-level, and application-level modules as appropriate. Furthermore, the communication module 206 may include any memory components used for storage, execution, and data processing for performing processing activities associated with the communication module 206. The communication module 206 may also form a portion of other circuitry described without departure from the scope of the present subject matter.

A memory 208 includes a form information storage area 210 that stores information, such as identified usage characteristics and/or trends for fields associated with the graphical user interface (GUI) form, within the computing device 102. As will be described in more detail below, form information stored within the form information storage area 210 is used to automatically change a displayed version of a GUI form based upon the identified usage characteristics and/or trends for each field, either to provide feedback to a form designer or to automatically change a form during run-time processing of an application.

It is understood that the memory 208 may include any combination of volatile and non-volatile memory suitable for the intended purpose, distributed or localized as appropriate, and may include other memory segments not illustrated within the present example for ease of illustration purposes. For example, the memory 208 may include a code storage area, a code execution area, and a data area without departure from the scope of the present subject matter.

A usage analysis module 212 and a form layout module 214 are also illustrated. The usage analysis module 212 provides creation and processing capabilities for the historical form usage information for the computing device 102, as described above and in more detail below. The form layout module 214 implements the automated form layout based upon usage patterns of the computing device 102.

Though the usage analysis module 212 and the form layout module 214 are illustrated as a component-level module for ease of illustration and description purposes, it should be noted that the usage analysis module 212 and the form layout module 214 may include any hardware, programmed processor(s), and memory used to carry out the functions of these modules as described above and in more detail below. For example, the usage analysis module 212 and the form layout module 214 may include additional controller circuitry in the form of application specific integrated circuits (ASICs), processors, and/or discrete integrated circuits and components for performing communication and electrical control activities associated with the respective devices. Additionally, the usage analysis module 212 and the form layout module 214 may also include interrupt-level, stack-level, and application-level modules as appropriate. Furthermore, the usage analysis module 212 and the form layout module 214 may include any memory components used for storage, execution, and data processing for performing processing activities associated with the module.

It should also be noted that the usage analysis module 212 and the form layout module 214 may form a portion of other circuitry described without departure from the scope of the present subject matter. Further, the usage analysis module 212 and the form layout module 214 may alternatively be implemented as an application stored within the memory 208. In such an implementation, the usage analysis module 212 and the form layout module 214 may include instructions executed by the CPU 200 for performing the functionality described herein. The CPU 200 may execute these instructions to provide the processing capabilities described above and in more detail below for the computing device 102. The usage analysis module 212 and the form layout module 214 may form a portion of an interrupt service routine (ISR), a portion of an operating system, a portion of a browser application, or a portion of a separate application without departure from the scope of the present subject matter.

A timer/clock module 216 is illustrated and used to determine timing and date information, such as a duration of time or time frames during which form fields have either higher or lower relative usage, as discussed above and in more detail below. As such, the usage analysis module 212 may utilize information derived from the timer/clock module 216 for information processing activities, such as the automated form layout based upon usage patterns described herein.

The form usage database 108 is illustrated in association with the computing device 102 and provides storage capabilities for information associated with the automated form layout based upon usage patterns of the computing device 102, as described above and in more detail below. As such, while the example of FIG. 1 shows the form usage database 108 interconnected via the network 104, the example of FIG. 2 shows that the form usage database 108 may be a local database without departure from the scope of the present subject matter.

The CPU 200, the display 202, the input device 204, the communication module 206, the memory 208, the usage analysis module 212, the form layout module 214, the timer/clock module 216, and the form usage database 108 are interconnected via an interconnection 218. The interconnection 218 may include a system bus, a network, or any other interconnection capable of providing the respective components with suitable interconnection for the respective purpose.

While the computing device 102 is illustrated with and has certain components described, other modules and components may be associated with the computing device 102 without departure from the scope of the present subject matter. Additionally, it should be noted that, while the computing device 102 is described as a single device for ease of illustration purposes, the components within the computing device 102 may be co-located or distributed and interconnected via a network without departure from the scope of the present subject matter. For a distributed arrangement, the display 202 and the input device 204 may be located at a point of sale device, kiosk, or other location, while the CPU 200 and memory 208 may be located at a local or remote server. Many other possible arrangements for components of the computing device 102 are possible and all are considered within the scope of the present subject matter. It should also be understood that, though the form usage database 108 is illustrated as a separate component, information stored within the form usage database 108 may also be stored within the memory 208 without departure from the scope of the present subject matter. Accordingly, the computing device 102 may take many forms and may be associated with many platforms.

Figure 3:
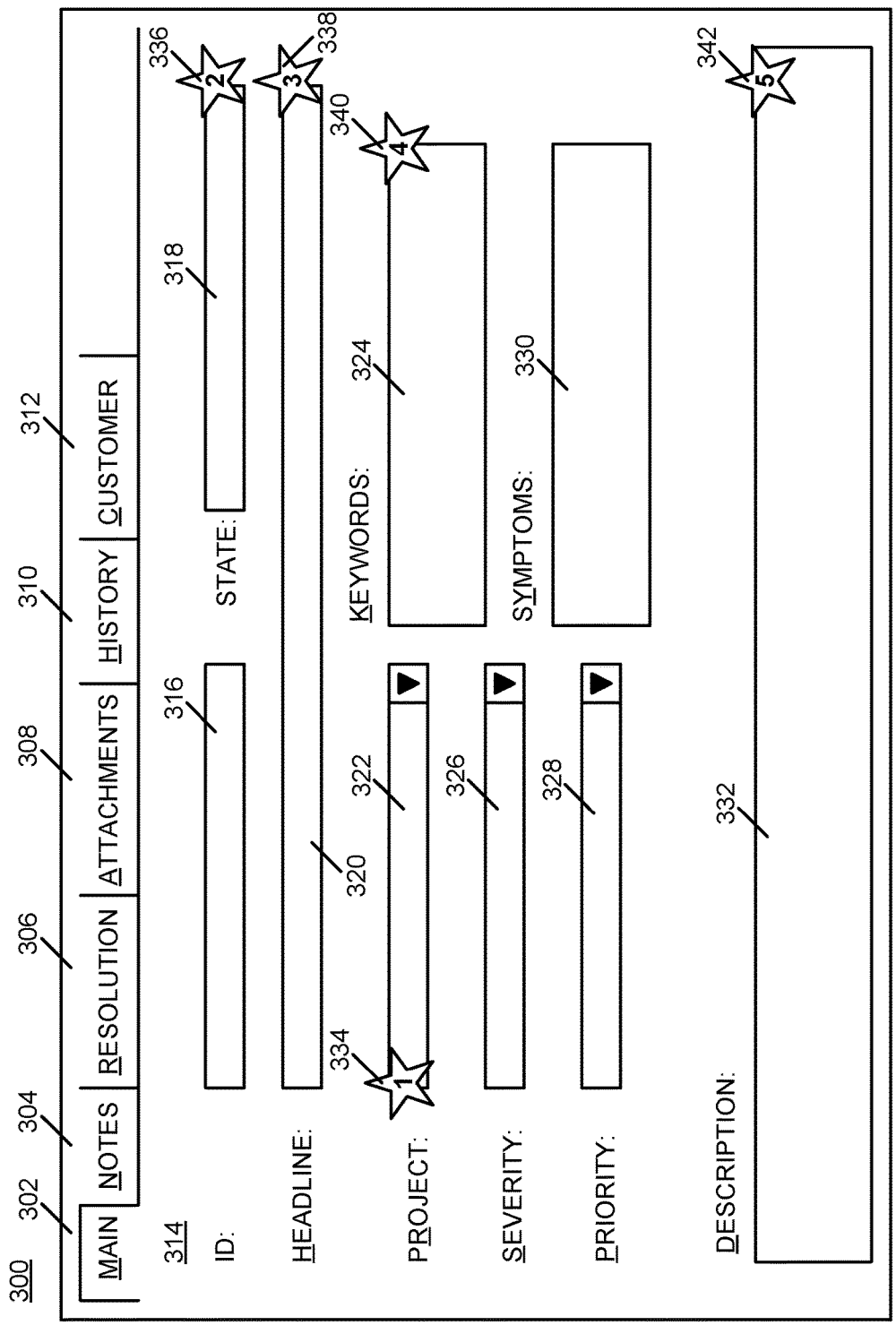
FIG. 3 is an illustration of an example of an implementation of a graphical user interface (GUI) that illustrates one possible form of highlighting based upon automated form layout analysis based upon usage patterns according to an embodiment of the present subject matter.
Figure 4:
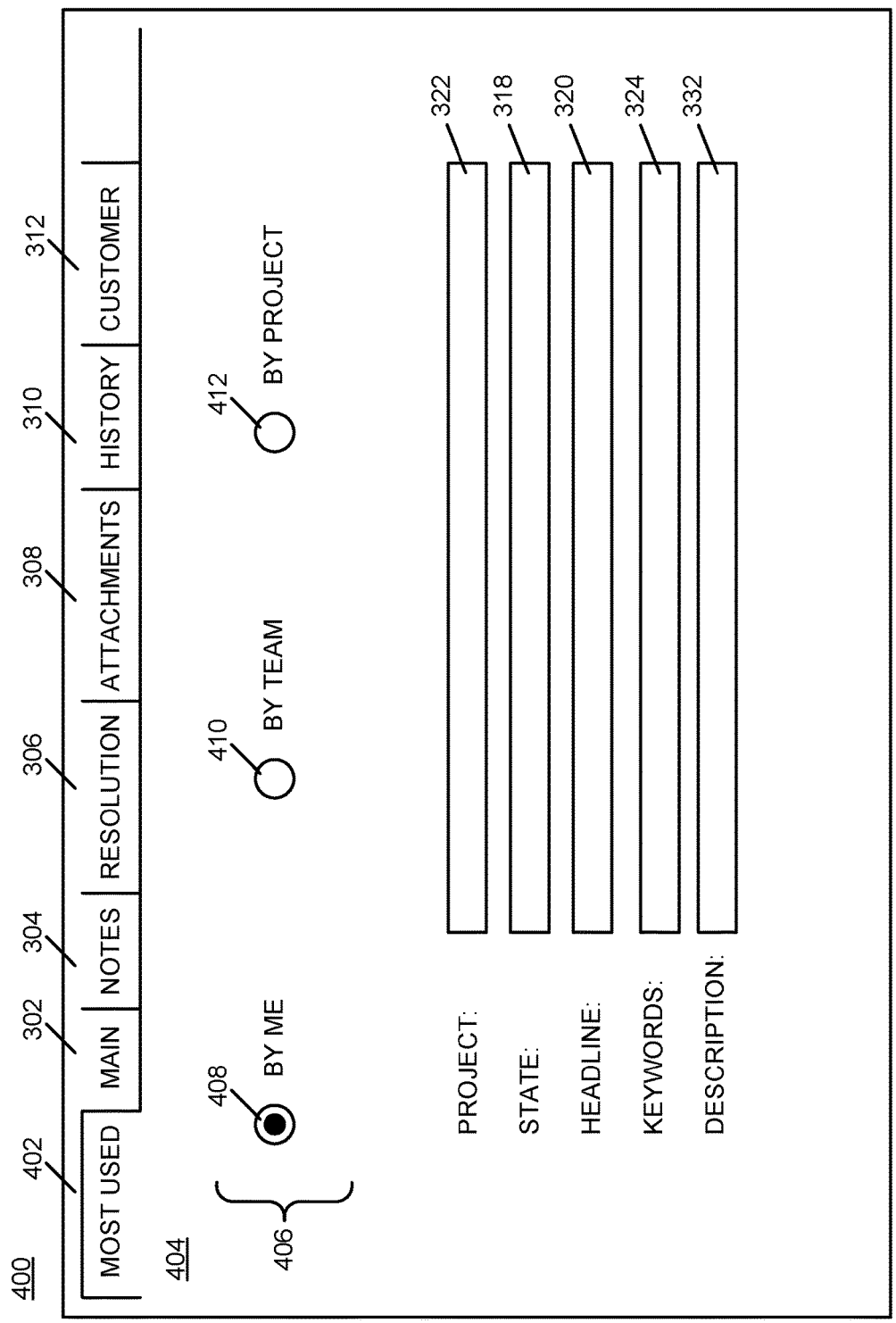
FIG. 4 is an illustration of an example of an implementation of a GUI that illustrates one possible reorganization of the GUI of FIG. 3 based upon automated form layout analysis based upon usage patterns according to an embodiment of the present subject matter.

FIG. 3 and FIG. 4 described below represent example graphical user interfaces (GUIs) that may be automatically modified and/or created by devices, such as the computing device 102, to perform the automated form layout based upon usage pattern associated with the present subject matter. Many other variations on the example GUIs are possible and all are considered within the scope of the present subject matter.

FIG. 3 is an illustration of an example of an implementation of a GUI 300 that illustrates one possible form of highlighting based upon automated form layout analysis based upon usage patterns. As can be seen from the GUI 300, a Main tab 302, a Notes tab 304, a Resolution tab 306, an Attachments tab 308, a History tab 310, and a Customer tab 312 are illustrated. It is understood that each of these tabs 302 through 312 represents a different form within the GUI 300. It is further understood that a selection of each of these tabs, such as via the input device 204, may be detected by the computing device 102 to display an associated respective form. For purposes of the present example, only a form 314 associated with the Main tab 302 is depicted within the GUI 300.

Within the form 314, several text entry fields are depicted. An ID field 316, a State field 318, a Headline field 320, a Project field 322, a Keywords field 324, a Severity field 326, a Priority field 328, a Symptoms field 330, and a Description field 332 are depicted. It is understood that this example form 314 may be associated with a user interface application for project error tracking or for another purpose without departure from the scope of the present subject matter.

Several graphical stars are depicted and represent identified usage characteristics and/or trends for certain of the fields. As can be seen from the form 314, a star 334 has a numeral one (1) representing that it is the most-used field of the form 314. A star 336 has a numeral two (2) representing that it is the second most-used field of the form 314. Similarly, a star 338 has a numeral three (3), a star 340 has a numeral four (4), and a star 342 has a numeral five (5), respectively, representing that these are the third, fourth, and fifth most-used fields of the form 314. As such, each of the depicted stars 334 through 342 has a number associated with its usage ranking based upon the analysis of historical form usage information for the respective fields of the form 314.

It should be understood that, though the form 314 has additional fields, for purposes of the present example, the respective fields associated with the stars 334 through 342 provide a sufficient number of highlighted fields for description of the present example. However, it is also understood that additional fields may be highlighted indicating additional usage characteristics and/or trends. Further, other variations on highlighting may be used, such as for example, automatically drawing a surrounding box or colored box around those fields. Many other variations on highlighting are also possible. As such, the use of the star 334 through 342 is for ease of illustration purposes for the present highlighting example only and many other variations on the present example are possible without departure from the scope of the present subject matter.

FIG. 4 is an illustration of an example of an implementation of a graphical user interface (GUI) 400 that illustrates one possible reorganization of the GUI 300 of FIG. 3 based upon automated form layout analysis based upon usage patterns. As can be seen from the GUI 400, a new Most-Used tab 402 has been added to the GUI 300 of FIG. 3. A new form 404 is associated with the Most-Used tab 402.

A row of radio buttons 406 represent GUI elements for selecting various reorganizations of the form 404. The row of radio buttons 406 includes a Most-Used By Me radio button 408, a Most-Used By Team radio button 410, and a Most-Used by Project radio button 412. As such, in response to detection of selections of the different radio buttons 408 through 412, the computing device 102 may reorganize the form 404 based upon the historical usage analysis by the respective user or group of users.

As can be seen from the form 404, the Project field 322, the State field 318, the Headline field 320, the Keywords field 324, and the Description field 332, which represent the most-used fields described in association with FIG. 3, are displayed on the form 404. It should further be noted that the Project field 322, the State field 318, the Headline field 320, the Keywords field 324, and the Description field 332 are displayed in the their respective order of determined ranking based upon the automated form layout analysis based upon usage patterns described herein. As such, the form 404 represents a new form that was automatically created and added to the GUI 300 of FIG. 3 in response to either a run-time configuration option for automatically reorganizing a form layout or in response to detection of an input, such as via the input device 204, from a developer requesting such a reorganization.

It should be noted that the present example shows one possible implementation of an automatically-created form that includes higher-used form fields. Further, the present example shows one possible implementation of form reorganization to sequence form fields based upon a usage ranking. However, many variations on these examples are possible and all are considered within the scope of the present subject matter.

Figure 5:
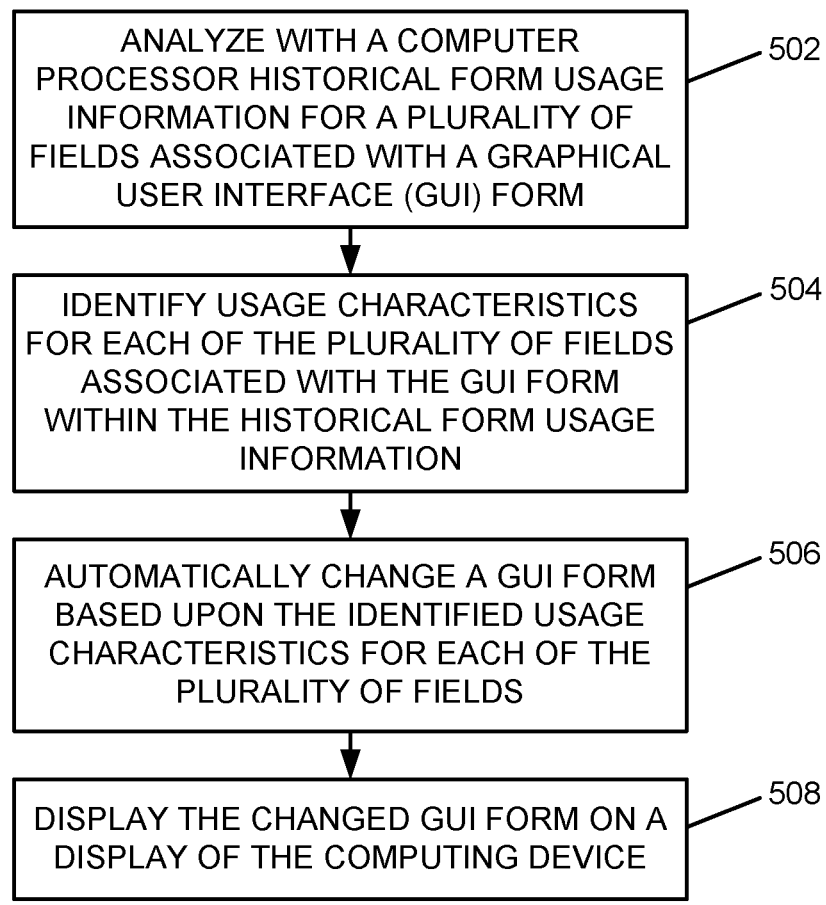
FIG. 5 is a flow chart of an example of an implementation of a process for automated form layout based upon usage patterns according to an embodiment of the present subject matter.
Figure 6:
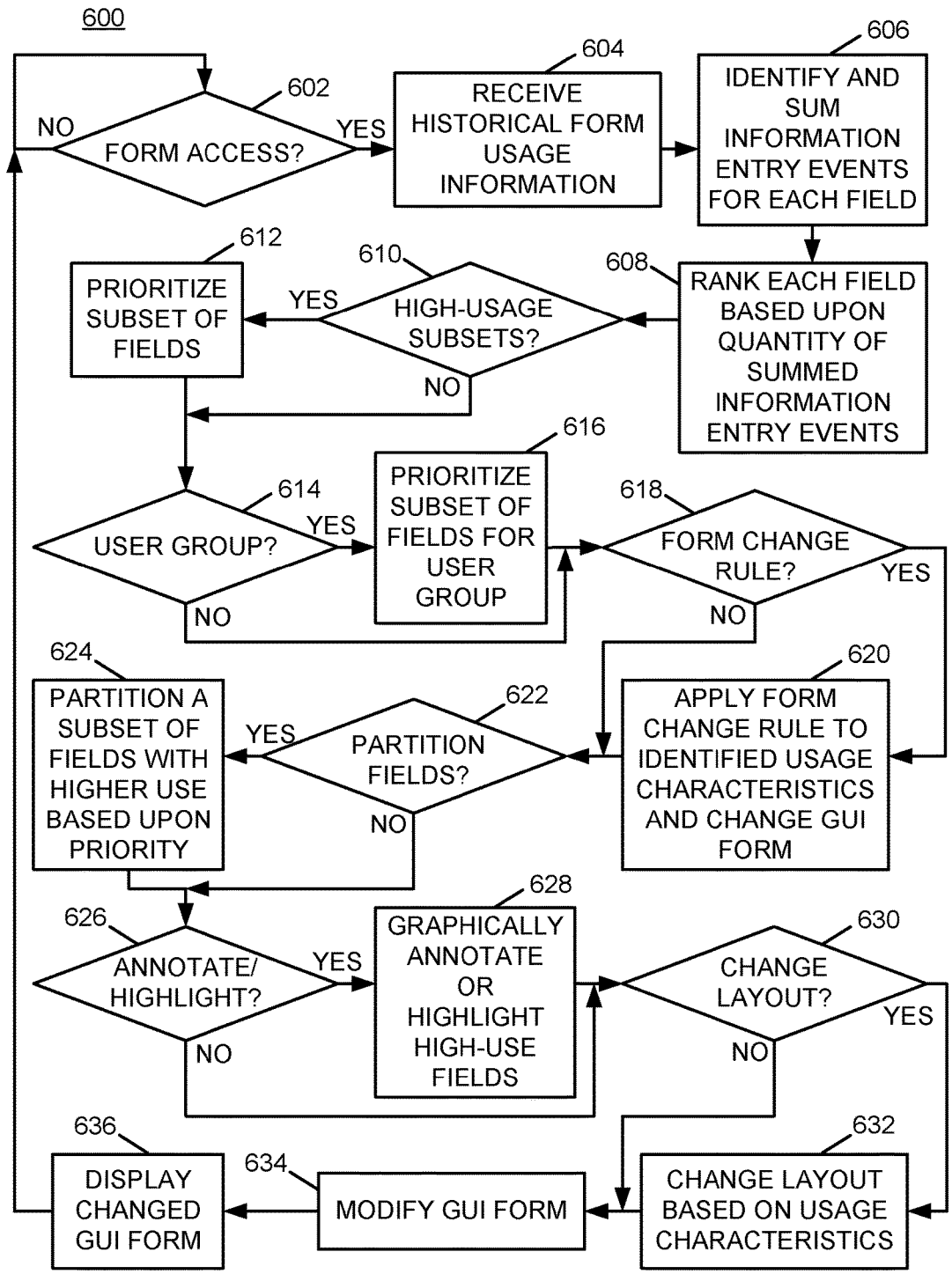
FIG. 6 is a flow chart of an example of an implementation of a process that prioritizes form fields and that modifies GUI forms based upon automated form layout based upon usage patterns according to an embodiment of the present subject matter.

FIG. 5 and FIG. 6 described below represent example processes that may be executed by devices, such as the computing device 102, to perform the automated form layout based upon usage pattern associated with the present subject matter. Many other variations on the example processes are possible and all are considered within the scope of the present subject matter. The example processes may be performed by modules, such as the usage analysis module 212, the form layout module 214, and/or executed by the CPU 200, associated with such devices. It should be noted that time out procedures and other error control procedures are not illustrated within the example processes described below for ease of illustration purposes. However, it is understood that all such procedures are considered to be within the scope of the present subject matter.

FIG. 5 is a flow chart of an example of an implementation of a process 500 for automated form layout based upon usage patterns. At block 502, the process 500 analyzes with a computer processor historical form usage information for a plurality of fields associated with a graphical user interface (GUI) form. At block 504, the process 500 identifies usage characteristics for each of the plurality of fields associated with the GUI form within the historical form usage information. At block 506, the process 500 automatically changes a GUI form based upon the identified usage characteristics for each of the plurality of fields. At block 508, the process 500 displays the changed GUI form on a display of the computing device.

FIG. 6 is a flow chart of an example of an implementation of a process 600 that prioritizes form fields and that modifies GUI forms based upon automated form layout based upon usage patterns. At decision point 602, the process 600 makes a determination as to whether a form access event has been detected. A form access event may include, for example, opening of an application that includes a form, a change from one application form to another (e.g., such as via selection of a tab within a tabbed GUI element), an access to a form via a form development tool for development purposes, or any other form access event. When a determination is made that a form access event has been detected, the process 600 receives historical form usage information for analysis to identify usage characteristics (e.g., trends) for form fields at block 604.

At block 606, the process 600 identifies and sums information entry events for each form field associated with the GUI form within the historical form usage information. At block 608, the process 600 associates a rank with each of the form fields based upon a quantity of the summed information entry events associated with each of the fields.

At decision point 610, the process 600 makes a determination as to whether any subsets of the fields associated with the GUI form are used more than other fields or subsets of fields (e.g., high-use subsets). When a determination is made that there is at least one subset of the fields that represents a higher-use subset, the process 600 prioritizes any identified subset(s) of the fields within the GUI form at block 612. Prioritization may include, for example, setting a flag or other indication associated with a given form field to identify the respective priority.

When a determination is made at decision point 610 that there is not at least one subset of the fields that represents a higher-use subset, or when prioritization has been completed at block 612, the process 600 makes a determination at decision point 614 as to whether a group of form users associated with any prioritized subset(s) within the GUI form are identified. For example, a group of users may be a project team, a group of friends, a group of individuals associated with a same employer, or other identifiable group. When a determination is made that at least one group of users has been identified in association with a prioritized subset of fields, the process 600 further prioritizes the subset of the fields within the GUI form for the identified group of form users at block 616. As with the prioritization described above, a flag or other indication may be used to indicate relative priorities among form fields for prioritization for a given group. Multiple groups may be identified and form fields may be prioritized in a customized fashion for each of the respective groups. It is further understood that many other possibilities exist for prioritizing a subset of form fields for a group and all are considered within the scope of the present subject matter.

When a determination is made at decision point 614 that at least one group of users has not been identified in association with a prioritized subset of fields, or upon completion of the further prioritization at block 616, the process 600 makes a determination at decision point 618 as to whether a form change rule is available for managing changes to a GUI form based upon identified priorities. When a determination is made that a form change rule is available for managing changes to a GUI form based upon identified priorities, the process 600 applies the form change rule to the identified usage characteristics and/or trends for each of the subset of fields associated with the GUI form at block 620.

For example, a form change rule may include a rule for selecting the prioritized subset(s) of the fields (e.g., high-use subsets of fields and/or fields prioritized for one or more groups) and repositioning a display location for the subset(s) of the plurality of fields within the GUI form and/or changing an order of fields within the subset(s) of the fields based upon relative priorities of the fields within the subset(s) of the fields. As another example, form fields may be reordered. Many other possibilities exist for creation and processing of form change rules and all are considered within the scope of the present subject matter.

When a determination is made at decision point 618 that a form change rule is not available for managing changes to a GUI form based upon identified priorities at decision point 618, or upon completion of applying the rule at block 620, the process 600 makes a determination at decision point 622 as to whether to partition any of the prioritized subsets of fields based upon the assigned priorities. For example, the subset of fields prioritized for an identified group may be partitioned by placing the subset of fields within a separate form or a separate tabbed section of a form, such as the form 404 indexed using the Most-Used tab 402 as described above in association with FIG. 4. However, it is understood that many possibilities exist for partitioning prioritized form fields and all are considered within the scope of the present subject matter. When a determination is made to partition any of the prioritized subsets of fields onto a tabbed section of a GUI form at decision point 622, the process 600 partitions a subset of the fields identified with the higher-usage characteristics relative to another subset of the fields at block 624.

When a determination is made not to partition any of the prioritized subsets of fields onto a tabbed section of a GUI form at decision point 622, or upon completion of partitioning the subset of form fields identified with the higher-usage characteristics at block 624, the process 600 makes a determination at decision point 626 as to whether to annotate (e.g., highlight) any of the fields of the GUI form. When a determination is made to annotate (e.g., highlight) any of the fields of the GUI form, the process 600 annotates (e.g., highlights) the form field(s) at block 628. Annotations and highlighting may include, for example, graphically marking a form field, such as via one of the stars 334 through 342 described above in association with FIG. 3, or via other graphical icons or notation, including ranking and numerically identifying the usage characteristics and/or trends. Annotation and highlighting may further include, for example, graphically annotating at least one of the fields within the GUI form with the identified usage characteristic associated with the fields, and slowly de-emphasizing, slowly emphasizing, or highlighting by placing a box around one or more fields. For example, as fields are detected to have decreased use over time, these fields may be de-emphasized by moving them to lower positions in a form or onto a separate tabbed portion of a form. Similarly, as fields are detected to have increased use over time, these fields may be emphasized by moving them to higher positions in a form or onto a prioritized tabbed portion of a form. Many other possibilities exist for annotating and highlighting fields based upon identified usage characteristics and/or trends and all are considered within the scope of the present subject matter.

When a determination is made at decision point 626 not to annotate or highlight any of the fields of the form, or upon completion of annotation and highlighting at block 628, the process 600 makes a determination as to whether to change a layout of the fields of the GUI form at decision point 630. For example, the process 600 may change a layout of the fields within the GUI form based upon the prioritization and/or identified usage characteristics for each of the fields. The process 600 may further change the layout of the fields of the GUI form based upon prioritized ranking associated with the identified usage characteristics. Changes to the layout may include moving fields, reordering fields, or any other change to emphasize or de-emphasize fields based upon the identified usage characteristics. Many other possibilities exist for changing a layout of the fields of a GUI form based upon identified usage characteristics and/or trends and all are considered within the scope of the present subject matter. When a determination is made to change the layout of the fields of the GUI form, the process 600 changes the layout of the form fields at block 632. It should be noted, as described above, that certain fields may be locked and may not be reordered. Further, groups of fields may be configured to be reorderable within the given group, but not movable from the group based upon the given implementation. Again, many possibilities exist for locking and grouping form fields and all are considered within the scope of the present subject matter.

When a determination is made not to change the layout of the form fields at decision point 630, or upon changing the layout of the form fields at block 632, the process 600 modifies the GUI form to operate based upon the automatically changed GUI form at block 634. For example, the process 600 may modify a form definition that is utilized by existing form executable code without departure from the scope of the present subject matter. In such an implementation, the existing executable code may render the respective GUI form using the modified form definition. Alternatively, the process 600 may modify executable code associated with the GUI form. It is further understood that the processing for modification of executable code may further include compilation, assembly, building, or otherwise preparing the modified code for execution or interpretation, as appropriate for the given implementation. In such an implementation, the processing at block 634 may further include executing the modified executable code associated with the GUI form. Many other variations on the processing for form modification are possible and all are considered within the scope of the present subject matter. The process 600 displays the changed GUI form at block 636 and returns to decision point 602 to await another form access event.

As such, the process 600 receives and analyzes historical form usage information for fields associated with a form. The process 600 further identifies usage characteristics and/or trends for each of the fields associated with the form within the historical form usage information. The process 600 prioritizes and groups fields based upon usage, either across all users or among identified groups of users, and automatically changes a displayed version of the form based upon the identified usage characteristics for each of the fields. The automated changes include graphically annotating fields, partitioning fields, changing a layout of the form, and automatically modifies the form based upon the usage characteristics and/or trends.

As described above in association with FIG. 1 through FIG. 6, the example systems and processes provide automated form layout based upon usage pattern. Many other variations and additional activities associated with automated form layout based upon usage pattern are possible and all are considered within the scope of the present subject matter.

Those skilled in the art will recognize, upon consideration of the above teachings, that certain of the above examples are based upon use of a programmed processor, such as the CPU 200. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   automatically partitioning, at a computing device as a runtime execution improvement to an executing computer application based upon historical usage characteristics of each of a plurality of input fields associated with a displayed graphical user interface (GUI) form of the computer application, a subset of the plurality of input fields into a new form within a new tabbed portion of the displayed GUI form with a set of selectable options that allow a user to select between (i) reorganizing the subset of the plurality of input fields within the new form according to historical input field usage analysis of the user and (ii) reorganizing the subset of the plurality of input fields within the new form according to historical input field usage analysis of a group of form users within which the user is a member; and
   reorganizing, as a further runtime execution improvement to the executing computer application, the subset of the plurality of input fields within the new form responsive to different user selections among the set of selectable options within the new form within the new tabbed portion of the displayed GUI form.

2. The method of claim 1, further comprising, during execution of the computer application:
   identifying, via the computing device, information entry events associated with each of the plurality of input fields associated with the displayed GUI form within the historical usage characteristics;
   summing, for each of the plurality of input fields, the identified information entry events associated with that input field;
   associating a rank with each of the plurality of input fields based upon a quantity of the summed information entry events associated with each of the plurality of input fields; and
   identifying the subset of the plurality of input fields as input fields with higher usage characteristics based upon the rank associated with each of the plurality of input fields.

3. The method of claim 1, where the group of form users within which the user is the member comprises one of a project team, an organization, and a group of friends of the user.

4. The method of claim 1, further comprising identifying the subset of the plurality of input fields as input fields of the plurality of input fields with higher usage characteristics relative to other input fields of the plurality of input fields, and where automatically partitioning the subset of the plurality of input fields into the new form within the new tabbed portion of the displayed GUI form comprises:
   creating a new most-used tabbed portion of the displayed GUI form;
   displaying the set of selectable options within the new most-used tabbed portion of the displayed GUI form;
   initially selecting one of the set of selectable options that represents one of the user and the group of form users within which the user is the member; and
   initially organizing the subset of the plurality of input fields with the higher usage characteristics within the new most-used tabbed portion of the displayed GUI form according to the historical input field usage analysis associated with the initially selected one of the user and the group of form users within which the user is the member.

5. The method of claim 1, where automatically partitioning the subset of the plurality of input fields into the new form within the new tabbed portion of the displayed GUI form comprises:
   applying a form change rule to the historical usage characteristics of each of the plurality of input fields associated with the displayed GUI form; and
   automatically partitioning input fields of the plurality of input fields with higher usage characteristics relative to other input fields of the plurality of input fields into the new form within the new tabbed portion of the displayed GUI form based upon the applied form change rule.

6. The method of claim 1, further comprising:
modifying, via the computing device during execution of the computer application, one of a form definition and executable code associated with the displayed GUI form to operate based upon the automated partitioning of the displayed GUI form; and
where automatically partitioning the subset of the plurality of input fields into the new form within the new tabbed portion of the displayed GUI form comprises one of:
rendering, during execution of the computer application, the displayed GUI form using the modified form definition; and
executing, during execution of the computer application, the modified executable code associated with the displayed GUI form.

7. The method of claim 1, further comprising:
gradually changing, during execution of the computer application, emphasis of graphical highlighting of at least one of the plurality of input fields within the new form within the new tabbed portion of the displayed GUI form in response to detecting changes to frequency of use of the at least one of the plurality of input fields over time.

8. A system, comprising:
a display; and
a processor programmed to:
automatically partition, as a runtime execution improvement to an executing computer application based upon historical usage characteristics of each of a plurality of input fields associated with a displayed graphical user interface (GUI) form of the computer application, a subset of the plurality of input fields into a new form within a new tabbed portion of the displayed GUI form with a set of selectable options that allow a user to select between (i) reorganizing the subset of the plurality of input fields within the new form according to historical input field usage analysis of the user and (ii) reorganizing the subset of the plurality of input fields within the new form according to historical input field usage analysis of a group of form users within which the user is a member; and
reorganize, as a further runtime execution improvement to the executing computer application, the subset of the plurality of input fields within the new form responsive to different user selections among the set of selectable options within the new form within the new tabbed portion of the displayed GUI form.

9. The system of claim 8, where the processor is further programmed to:
identify information entry events associated with each of the plurality of input fields associated with the displayed GUI form within the historical usage characteristics;
sum, for each of the plurality of input fields, the identified information entry events associated with that input field;
associate a rank with each of the plurality of input fields based upon a quantity of the summed information entry events associated with each of the plurality of input fields; and
identify the subset of the plurality of input fields as input fields with higher usage characteristics based upon the rank associated with each of the plurality of input fields.

10. The system of claim 8, where the processor is further programmed to identify the subset of the plurality of input fields as input fields of the plurality of input fields with higher usage characteristics relative to other input fields of the plurality of input fields, and where, in being programmed to automatically partition the subset of the plurality of input fields into the new form within the new tabbed portion of the displayed GUI form, the processor is programmed to:
create a new most-used tabbed portion of the displayed GUI form;
display the set of selectable options within the new most-used tabbed portion of the displayed GUI form;
initially select one of the set of selectable options that represents one of the user and the group of form users within which the user is the member; and
initially organize the subset of the plurality of input fields with the higher usage characteristics within the new most-used tabbed portion of the displayed GUI form according to the historical input field usage analysis associated with the initially selected one of the user and the group of form users within which the user is the member.

11. The system of claim 8, where, in being programmed to automatically partition the subset of the plurality of input fields into the new form within the new tabbed portion of the displayed GUI form, the processor is programmed to:
apply a form change rule to the historical usage characteristics of each of the plurality of input fields associated with the displayed GUI form; and
automatically partition input fields of the plurality of input fields with higher usage characteristics relative to other input fields of the plurality of input fields into the new form within the new tabbed portion of the displayed GUI form based upon the applied form change rule.

12. The system of claim 8, where the processor is further programmed to:
modify, during execution of the computer application, one of a form definition and executable code associated with the displayed GUI form to operate based upon the automated partitioning of displayed GUI form; and
where, in being programmed to automatically partition the subset of the plurality of input fields into the new form within the new tabbed portion of the displayed GUI form, the processor is programmed to one of:
render, during execution of the computer application, the displayed GUI form using the modified form definition; and
execute, during execution of the computer application, the modified executable code associated with the displayed GUI form.

13. The system of claim 8, where the processor is further programmed to:
gradually change, during execution of the computer application, emphasis of graphical highlighting of at least one of the plurality of input fields within the new form within the new tabbed portion of the displayed GUI form in response to detecting changes to frequency of use of the at least one of the plurality of input fields over time.

14. A computer program product, comprising:
a non-transitory computer readable storage medium having computer readable program code stored therewith, where the computer readable program code when executed on a computer causes the computer to:
automatically partition, as a runtime execution improvement to an executing computer application based upon historical usage characteristics of each of a plurality of input fields associated with a displayed graphical user interface (GUI) form of the computer application, a subset of the plurality of input fields into a new form within a new tabbed portion of the displayed GUI form with a set of selectable options that allow a user to select between (i) reorganizing the subset of the plurality of input fields within the new form according to historical input field usage analysis of the user and (ii) reorganizing the subset of the plurality of input fields within the new form according to historical input field usage analysis of a group of form users within which the user is a member; and reorganize, as a further runtime execution improvement to the executing computer application, the subset of the plurality of input fields within the new form responsive to different user selections among the set of selectable options within the new form within the new tabbed portion of the displayed GUI form.

15. The computer program product of claim 14, where the computer readable program code when executed on the computer further causes the computer to:

identify information entry events associated with each of the plurality of input fields associated with the displayed GUI form within the historical usage characteristics;

sum, for each of the plurality of input fields, the identified information entry events associated with that input field;

associate a rank with each of the plurality of input fields based upon a quantity of the summed information entry events associated with each of the plurality of input fields; and identify the subset of the plurality of input fields as input fields with higher usage characteristics based upon the rank associated with each of the plurality of input fields.

16. The computer program product of claim 14, where the group of form users within which the user is the member comprises one of a project team, an organization, and a group of friends of the user.

17. The computer program product of claim 14, where the computer readable program code when executed on the computer further causes the computer to identify the subset of the plurality of input fields as input fields of the plurality of input fields with higher usage characteristics relative to other input fields of the plurality of input fields, and where, in causing the computer to automatically partition the subset of the plurality of input fields into the new form within the new tabbed portion of the displayed GUI form, the computer readable program code when executed on the computer causes the computer to:

create a new most-used tabbed portion of the displayed GUI form;

display the set of selectable options within the new most-used tabbed portion of the displayed GUI form;

initially select one of the set of selectable options that represents one of the user and the group of form users within which the user is the member; and initially organize the subset of the plurality of input fields with the higher usage characteristics within the new most-used tabbed portion of the displayed GUI form according to the historical input field usage analysis associated with the initially selected one of the user and the group of form users within which the user is the member.

18. The computer program product of claim 14, where, in causing the computer to automatically partition the subset of the plurality of input fields into the new form within the new tabbed portion of the displayed GUI form, the computer readable program code when executed on the computer causes the computer to:

apply a form change rule to the historical usage characteristics of each of the plurality of input fields associated with the displayed GUI form; and automatically partition input fields of the plurality of input fields with higher usage characteristics relative to other input fields of the plurality of input fields into the new form within the new tabbed portion of the displayed GUI form based upon the applied form change rule.

19. The computer program product of claim 14, where the computer readable program code when executed on the computer further causes the computer to:

modify, during execution of the computer application, one of a form definition and executable code associated with the displayed GUI form to operate based upon the automated partitioning of displayed GUI form; and where, in causing the computer to automatically partition the subset of the plurality of input fields into the new form within the new tabbed portion of the displayed GUI form, the computer readable program code when executed on the computer causes the computer to one of:

render, during execution of the computer application, the displayed GUI form using the modified form definition; and execute, during execution of the computer application, the modified executable code associated with the displayed GUI form.

20. The computer program product of claim 14, where the computer readable program code when executed on the computer further causes the computer to:

gradually change, during execution of the computer application, emphasis of graphical highlighting of at least one of the plurality of input fields within the new form within the new tabbed portion of the displayed GUI form in response to detecting changes to frequency of use of the at least one of the plurality of input fields over time.

* * * * *